(12) United States Patent
Fujioka

(10) Patent No.: US 6,349,536 B1
(45) Date of Patent: Feb. 26, 2002

(54) MULTIFUNCTIONAL WATER INJECTION MANIFOLD DEVICE AND OPERATION METHOD THEREOF

(75) Inventor: Masanori Fujioka, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/592,281

(22) Filed: Jun. 12, 2000

(30) Foreign Application Priority Data

Mar. 10, 2000 (JP) .......................................... 12-066481

(51) Int. Cl.$^7$ ................................................ F02C 3/30
(52) U.S. Cl. ..................................... 60/39.05; 60/39.55
(58) Field of Search ............................. 60/39.05, 39.55, 60/393, 39.094

(56) References Cited

U.S. PATENT DOCUMENTS

| | | | | |
|---|---|---|---|---|
| 2,633,860 A | * | 4/1953 | Derrington | 60/39.55 |
| 5,784,875 A | * | 7/1998 | Statler | 60/39.55 |
| 6,145,294 A | * | 11/2000 | Traver et al. | 60/39.094 |

* cited by examiner

Primary Examiner—Michael Koczo
(74) Attorney, Agent, or Firm—Wenderoth, Lind & Ponack, L.L.P.

(57) ABSTRACT

A multifunctional water injection manifold device for injecting water into a gas turbine combustor for NOx reduction is provided so that draining of the manifold may be done even in a load operation of gas turbine, and reverse flow of high temperature high pressure combustion gas is prevented so as not to cause eruptive breakage of the manifold. An air communication means is provided at the top portion of the manifold (51) for causing the manifold (51) to communicate with the air so that draining of the manifold (51) is done. A pressure type check valve (54) is interposed in branch pipe (6) between the manifold (51) and the combustor (1) so that water is supplied from the manifold (51) into the combustor (1) when differential pressure between the manifold (51) and the combustor (1) reaches a predetermined pressure or more and the water is stopped when the differential pressure is less than the predetermined pressure. Even if water injection is stopped during gas turbine load operation, the draining can be done without waiting for a no load state and following the draining of the manifold (51), sweeping of water holes (16) of injection nozzle (17) can be done upon stopping the gas turbine thereby to cause no coking of liquid fuel in the water holes (16).

2 Claims, 5 Drawing Sheets

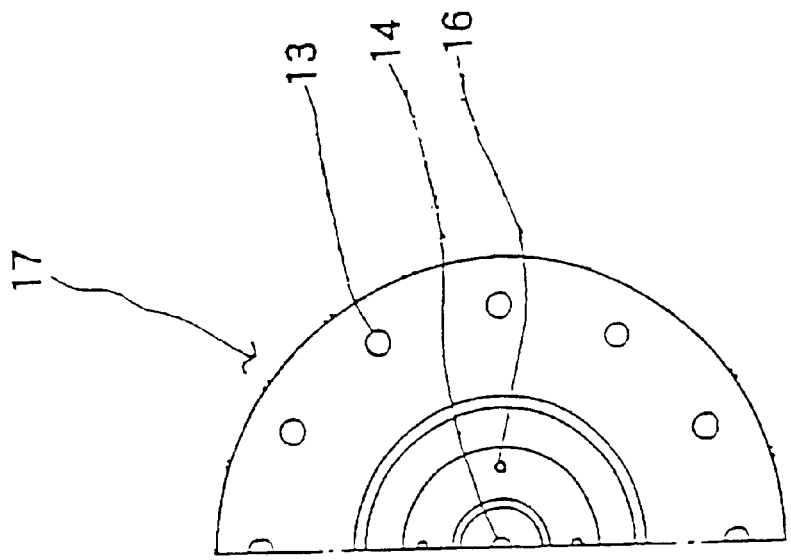
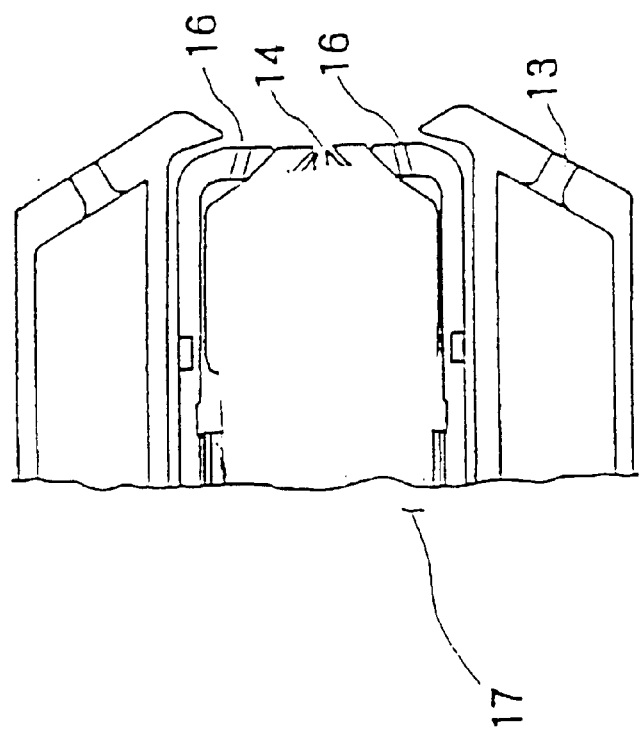
Fig. 6(a)(Prior Art)
Fig. 6(b)(Prior Art)

MULTIFUNCTIONAL WATER INJECTION MANIFOLD DEVICE AND OPERATION METHOD THEREOF

BACKGROUND OF THE INVENTION

1. Field of the Invention

The present invention relates generally to a water injection manifold device and an operation method thereof. The water injection manifold device can create a low NOx combustion by water injection into a combustor in an industrial gas turbine in the process of operation and stop thereof. The manifold device is designed particularly to have such a multifunction that water supplied into the combustor for reducing combustion temperature is prevented from coming into the gas turbine with water head existing still after a stop of the water supply. In addition, high temperature high pressure combustion gas in a turbine cylinder is prevented from coming reversely into the water injection manifold of which inner pressure is lowered by stop of water supply when dust accumulation occurs in a drain valve.

2. Description of the Prior Art

In order to realize a low NOx combustion in an oil mono-fuel combustor or an oil/gas dual-fuel combustor used in an industrial gas turbine, the flame temperature is usually reduced by mixing water into fuel or injecting water into the combustion zone.

As one example to reduce flame temperature in the oil mono-fuel combustor, the applicant here has heretofore disclosed an invention by the Japanese patent application No. Hei 11 (1999)-159756 titled, "Oil firing DLN (Dry Low NOx) combustor".

An oil firing premix type DLN combustor in a gas turbine comprises a water injection control device for controlling the flow rate of water to be injected into fuel corresponding to fuel flow rate. A pilot fuel system and main fuel A, B systems, including a fuel flow control valve, for fuel supply and a water injection system in the main fuel A, B systems, including a water flow detector and a water injection flow control valve, are provided, and the valves are controlled via a water injection flow control circuit so as to control water injection rate.

In this control circuit, a fuel flow control signal, a water flow detected signal and planned value signals on turbine cylinder pressure and injection water supply pressure are inputted so that valve openings are computed beforehand in proportion to the oil fuel flow rate and then the values so computed are corrected by a feedback signal from the detector. Thus, the valves are controlled so that the water injection rate may be controlled quickly corresponding to the oil fuel flow rate and so that NOx quantity generated by the combustion may be reduced.

Next, NOx reduction in a diffusion type combustor of a liquid mono-fuel gas turbine or a liquid/gas dual-fuel gas turbine in the prior art will be described with reference to FIGS. 3 to 5. FIG. 3 is a partial view of the gas turbine having a water injection manifold in the prior art, wherein an upper half of FIG. 3 shows a cross sectional view and a lower half thereof shows an outside side view. In FIG. 3, there is provided a water injection manifold 2 formed by a master pipe in an annulus of 5 to 6 m diameter surrounding a turbine cylindrical body near a plurality of combustors 1. The combustors 1 are arranged in ten to twenty or more pieces thereof in the turbine circumferential direction. In operation, water is injected into flames in each of the combustors 1 so as to lower combustion temperature thereby to reduce NOx generation in the combustor 1.

FIG. 4 is a block diagram of the water injection manifold 2. As shown there, a water supply pipe 3 is connected to the water injection manifold 2. A compressed air pipe 4 is connected directly to the water supply pipe 3, and a drain pipe 5 and a plurality of branch pipes 6 are also connected to the water supply pipe 3 via the water injection manifold 2. The water supply pipe 3 is for supplying therethrough a high pressure water of as a high pressure as 53 to 70 $kg/cm^2g$, which is a total nozzle differential pressure of about 40 to 50 $kg/cm^2g$ for water holes 16 of small diameter, to be described later with respect to FIG. 6, and combustion gas pressure of 13 to 20 $kg/cm^2g$ in the combustor 1 and in the turbine cylinder. By such arrangement, water is injected from the water injection manifold 2 into flames in the combustor 1 so as to lower an adiabatic flame temperature thereby to reduce the NOx quantity in the combustion gas, as mentioned above, and while the gas turbine is stopped, the water in the water injection manifold 2 is drained.

A water injection pump 7, a flow control valve 8 and a shut-off valve 9 are interposed in the water supply pipe 3. A sweep air supply valve 10 and a check valve 11 are interposed in the compressed air pipe 4 so that compressed air may be supplied through the compressed air pipe 4 as sweep air for preventing clogging of the water holes.

The drain pipe 5, being interposed with a drain valve 12 on the way, is connected to a lower end portion of the water injection manifold 2 so that water in the water injection manifold 2 may be drained when no water injection into the combustor 1 is needed.

Between the water injection manifold 2 and each of the combustors 1, there is provided the branch pipe 6 of at least ten mm diameter with neither a valve or similar item being specifically interposed therein.

As may be understood by the description of an injection nozzle 17 with respect to FIG. 6, when an oil firing operation is stopped, fuel oil may trail down on the injection nozzle 17 to the water holes 16 to be carbonized under a high temperature environment there, which may result in causing a clogging of the water holes 16. Hence, in order to prevent the clogging, when the oil firing operation is stopped, the sweep air supply valve 10 is opened so that the fuel oil which has so trailed to the water holes 16 may be blown off into the combustor 1.

Usually, in the prior art water injection device as mentioned above, operation is done such that when the gas turbine is ignited, the water injection is started at no load or at a certain low load and the water supply is increased as the load is increased thereby to lower the gas turbine adiabatic flame temperature and to make the outlet NOx quantity as low and as uniform as possible, because the NOx quantity is increased as the adiabatic flame temperature becomes higher.

On the other hand, when the gas turbine is stopped, as the load is lowered from the full load, the water supply is reduced. As soon as the fuel is stopped, the drain valve 12 is opened so that water remaining in the water injection manifold 2 may be drained instantly by the pressure of 6 to 10 $kg/cm^2g$ of the combustion gas remaining in the combustor 1 and turbine cylinder.

FIG. 5 is a graph showing examples of liquid fuel heat input and gas fuel heat input according to load state in the gas turbine of FIG. 3. The above operation of the water injection device will be described with reference to FIG. 5.

In case the gas turbine is operated from no load at the time of ignition to the full load by oil firing only, as shown by the rightward arrow along the horizontal axis, the water supply is increased from point a at no load to point e at the full load as the liquid fuel heat input is increased. In other words, the water supply is increased as the oil firing load is increased, like a→b→c→d→e. If the load is lowered from the full load, as shown by the leftward arrow along the horizontal axis, the water supply is reduced as the load decreases, like e→d→c→b→a.

Also, if the gas turbine is operated by oil and gas firing, (i) as one case, the gas firing operation is done from no load to a certain load, for example B load, and then the operation is changed to the oil firing up to the full load, that is, the water supply is increased as the load is increased, like g→h→i. If the load is lowered from the full load to no load, i→h→g, the oil fuel heat input is first reduced so that the load is lowered from the full load to B load, then the gas fuel heat input is reduced so that the load is lowered from B load to no load and the water supply is reduced corresponding to such lowering of the load. As an alternative case (ii), as the gas turbine is speeded after a gas ignition, the load is increased from no load to the full load by the oil and gas firing like g→f→k and the water supply is increased correspondingly to such increase of the load. If the load is lowered from the full load to no load, like k→f→g, the water supply is reduced correspondingly.

It is to be noted that in FIG. 5, point k at the full load shows a case where the gas fuel heat input is 70% and the liquid fuel heat input is 30%. While this ratio of the heat input may be changed freely, when the economy or the like is considered, the ratio of the gas fuel heat input to the liquid fuel heat input at the full load is usually set in the range of 70/30 to 30/70.

FIG. 6 is a view showing an example of an injection nozzle of the combustor 1, wherein FIG. 6(a) is a partial longitudinal cross sectional view and FIG. 6(b) is a half front view. The injection nozzle 17 for injecting water into the combustor 1 is constructed as follows. That is, an oil hole 14 is provided in an axial central portion of the injection nozzle 17, and the said oil hole 14 is for injecting fuel oil, together with air swirled by a primary swirler and a secondary swirler (both not shown), into the combustor 1. Surrounding the oil hole 14, four water holes 16 for injecting water are provided with equal pitches between each of the water holes 16 circumferentially. Along a further outer circumference of the oil hole 14, twelve gas holes 13 are provided with equal pitches between each of them so as to open to the combustor 1, and along an outermost circumference of the injection nozzle 17, a swirler (not shown) is provided for giving a swirling force on flames burning in front of the injection nozzle 17.

In the above, description has been made of the prior art for injecting water into the combustor 1 for reducing flame temperature thereby to realize a low NOx generation in a gas turbine having the water injection manifold 2 and the injection nozzle 17. In other words, in the prior art water injection manifold 2, the flow rate of the water pressurized at the water injection pump 7 is controlled by the flow control valve 8 so at to enter the water injection manifold 2 via the shut-off valve 9 and further to enter each of the injection nozzles 17 via each of the branch pipes 6, so that it is injected into each of the combustors 1 in the quantity corresponding to the gas turbine load. Thus, the high flame temperature in the combustor 1 is lowered and NOx quantity in the combustion gas is reduced.

In the course of the above water injection, while the water injection manifold 2 is as high as 5 to 6 m and there occurs water head of 5 to 6 m between an upper end and a lower end of the water injection manifold 2, the nozzle differential pressure is as large as 40 to 50 $kg/cm^2g$ and the water supplied is atomized enough in operation.

Moreover, when the gas turbine is stopped, the shut-off valve 9 is thereupon closed and the drain valve 12 is opened. As a result, residual water in the water injection manifold 2 is drained at the same time as parallel water from the operation by use of residual pressure in the turbine cylinder.

However, in the mentioned prior art water injection manifold used in the recent oil mono-fuel gas turbine and oil/gas dual-fuel gas turbine, there are coming out technical problems as follows. That is, the drain discharged from the drain valve 12 is often discharged into a sideditch or the like. Therefore, a dust accumulation is sometimes caused in the drain valve 12 at the time of the drain discharge and once this dust accumulation occurs in the drain valve 12, there is formed a small passage communicating with outside air in the drain line.

While the gas turbine is operated with the water injection being carried out, the inner pressure of the water injection manifold 2 is sufficiently higher than the inner pressure of 10 to 12 $kg/cm^2g$ of the turbine cylinder. Therefore, even if a small quantity of water leaks through such small passage of the drain line, it may not necessarily be a large problem. However, if the water injection is stopped for any reason during the operation at a certain load, the inner pressure of the water injection manifold 2 lowers rapidly and the high temperature high pressure combustion gas in the turbine cylinder may flow reversely into the water injection manifold 2 via the branch pipes 6 due to the inner pressure of 10 to 12 $kg/cm^2g$ of the turbine cylinder thereby to cause an eruptive breakage of the water injection manifold 2.

Also, as another problem, in case the timing of the water injection start/stop is set to a certain load, for example at a ¼ load, when the water injection is stopped, the draining operation of the water injection manifold 2 must pause until there is a no load state, as mentioned above, where the temperature and pressure in the turbine cylinder are sufficiently lowered which results in limiting a freedom of the operation.

Further, if such water injection stop and draining are not carried out at the same time, the water is not atomized enough by the water head of the water injection manifold 2 during such small time difference and flows into an inner lower portion of the gas turbine, which phenomenon has been observed at an actual gas turbine. If the start/stop operation of the gas turbine are repeated in such circumstances, the combustor 1 and the surrounding portion of the gas turbine first stage stationary blades are repeatedly heated and cooled rapidly with strong thermal shocks being caused, so that the gas turbine high temperature portion may be damaged.

SUMMARY OF THE INVENTION

In view of the problems in the prior art water injection manifold for injecting water into the combustor to lower the gas turbine adiabatic flame temperature thereby to reduce NOx quantity in the combustion gas, including a possibility of an eruption breakage of the water injection manifold by reverse flow of the high temperature high pressure combustion gas due to pressure lowering in the case of dust accumulation in the drain valve, a necessity of waiting for the draining until no load state in case the timing of the water injection start/stop operation is set to a certain load, a possibility of damage of the gas turbine high temperature portion due to the water not being atomized enough when the water injection stop and draining are not carried out at the same time, etc., it is an object of the present invention to provide an improve multifunctional water injection manifold device. The device can prevent the eruptive breakage of the water injection manifold even in the case of dust accumulation in the drain valve, enabling draining operation at the same time as the water injection stop without waiting for a no load state even if the timing of the water injection start/stop operation is set to a certain load, and preventing damage of the gas turbine high temperature portion even if the water injection stop and draining are not carried out at the same time.

In order to attain the mentioned object, the present invention provides a multifunctional water injection manifold device constructed as mentioned in the following:

(1) There is provided an air communication means, having an air vent pipe and an air vent valve, at a top portion of a water injection manifold filled with water to be injected into a combustor. The air communication means causes the water injection manifold to communicate with the air by opening the air vent valve when the water in the water injection manifold is to be drained.

(2) There is provided a pressure type check valve being interposed in a branch pipe for supplying the combustor with the water in the water injection manifold. The pressure type check valve causes the water in the water injection manifold to flow freely toward the combustor when a differential pressure between the water injection manifold and the combustor reaches a predetermined pressure or more, and closes a communication between the water injection manifold and the combustor when the differential pressure is less than the predetermined pressure. Consequently, for example, water not sufficiently atomized may be prevented from flowing from the water injection manifold toward the combustor when the differential pressure becomes lower than water head in the water injection manifold.

By the mentioned construction of the multifunctional water injection manifold device of the present invention, even when the timing of the water injection start/stop is set to a certain load, the water injection for lowering flame temperature in the combustor may be stopped during load operation of the gas turbine. Draining of the water injection manifold may then be done immediately without waiting for the state of no load of the temperature and pressure in the combustor and turbine cylinder.

That is, even when the water injection is stopped during load operation of the gas turbine and draining of the water injection manifold is to be done immediately, the water injection manifold is caused to communicate with outside air by opening the air vent valve so that the draining can be done naturally by gravity by opening the drain valve with no need to wait for a no load state. Also, even if there is dust accumulation in the drain valve to lower the pressure in the water injection manifold, high temperature high pressure combustion gas in the combustor and turbine cylinder is prevented from flowing reversely toward the water injection manifold by the pressure type check valve, and the eruptive damage of the water injection manifold by the combustion gas so flowing reversely can be prevented.

Also, when the draining of the water injection manifold has been done immediately after stopping of the water injection while the gas turbine is in operation, the sweep operation of the water holes can be done without waiting for the draining after stopping of the gas turbine. Hence, as soon as the liquid fuel firing operation is stopped, the sweep operation is done and the liquid fuel is prevented from trailing into the water holes opening near the oil hole, so that coking of the liquid fuel to cause a clogging of the water holes can be prevented securely.

Further, when the differential pressure between the water injection manifold and the combustor becomes lower than the water head of the water injection manifold filled with water, the communication between the water injection manifold and the combustor is closed by force of a spring provided in the pressure type check valve. Hence, the water not sufficiently atomized by the mentioned water head is prevented from flowing into the combustor from the water injection manifold to make contact with the high temperature portion of the combustor and the first stage stationary blade. Thus, the thermal shocks caused in the high temperature portion can be avoided and a damage of the high temperature portion is prevented.

According to the multifunctional water injection manifold device of the present invention as mentioned above, the water injection for NOx reduction can be stopped without damaging the gas turbine high temperature portion in any load operation of a liquid mono-fuel gas turbine or a liquid/gas dual-fuel gas turbine. Thus, the operation range of the water injection in the gas turbine is broadened remarkably. Also, the high temperature portion is not damaged, in no case, maintenance and repair cost can be reduced and a high economical effect can be obtained.

Moreover, the draining of the manifold and the sweep operation of the water holes, which are needed usually in the gas turbine, can be done securely with no waiting time even when the gas turbine load operation is stopped, thereby coking of the liquid fuel does not occur in the water holes and a stable operation is realized.

Thus, in the multifunctional water injection manifold device of the present invention, the timing of the water injection start/stop can be selected freely and a remarkable effect can be obtained in the economy, reliability and safe operation of the liquid mono-fuel gas turbine or the liquid/gas dual-fuel gas turbine.

Also, the present invention provides an operation method of a multifunctional water injection device comprising steps as mentioned in the following:

(3) causing water in a water injection manifold to be injected into a combustor (while a gas turbine is in load operation) so that the water communicates with air entering through an air communication means provided at a top portion of the water injection manifold;

(4) draining the water in the water injection manifold by opening a drain valve via a drain pipe provided at a bottom portion of the water injection manifold; and (5) when a shut-off valve is closed and pressure in the combustor is higher than that in the water injection manifold, preventing combustion gas from flowing reversely from the combustor toward the water injection manifold by a pressure type check valve interposed in a branch pipe for causing the water injection manifold to communicate with the combustor. In addition, preventing the water in the water injection manifold from flowing toward the combustor likewise by the pressure type check valve when a differential pressure between the water injection manifold and the combustor is less than a predetermined pressure. This, the draining of the water injection manifold may be done without waiting for a no load state even when the water injection for NOx reduction is stopped during any load operation of the gas turbine.

According to the operation method of a multifunctional water injection manifold device of the present invention comprising the steps mentioned above, the same function and effect as those mentioned with respect to the multifunctional water injection manifold device of the present invention can be obtained.

BRIEF DESCRIPTIONS OF THE DRAWINGS

FIG. 6 is a view showing a fuel nozzle of a combustor in the prior art, wherein FIG. 6(a) is a partial longitudinal cross sectional view and FIG. 6(b) is a half front view.

DESCRIPTION OF THE PREFERRED EMBODIMENT

Figure 1:
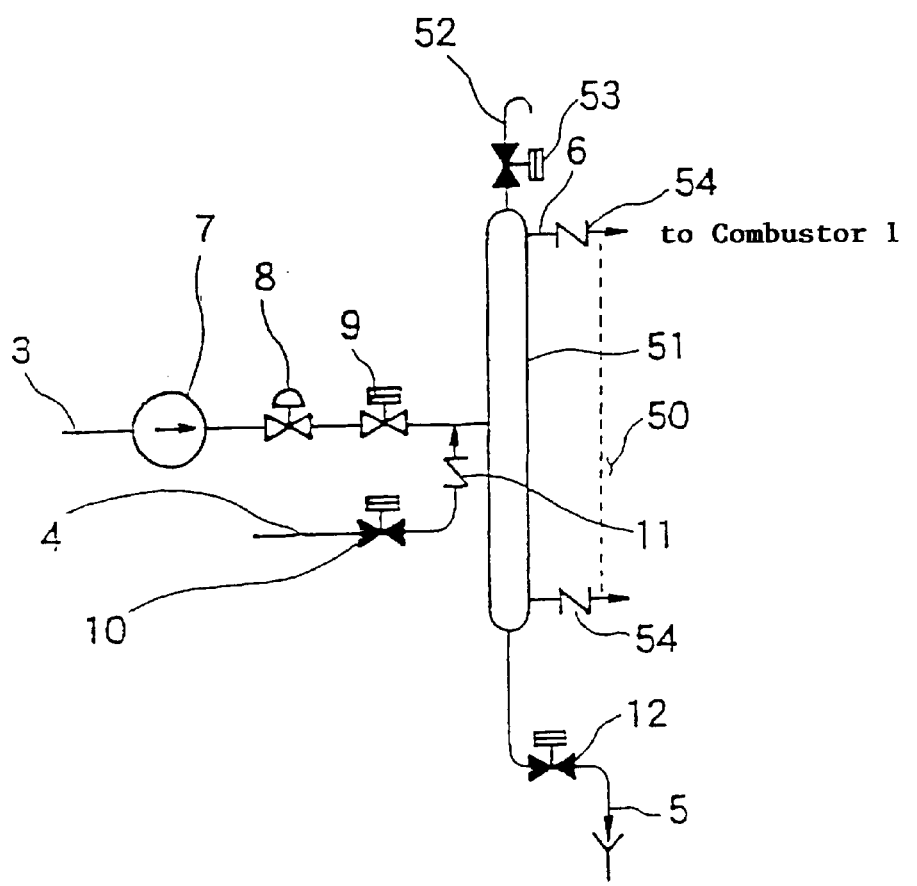
FIG. 1 is a block diagram showing a multifunctional water injection manifold device of an embodiment according to the present invention.
Figure 2:
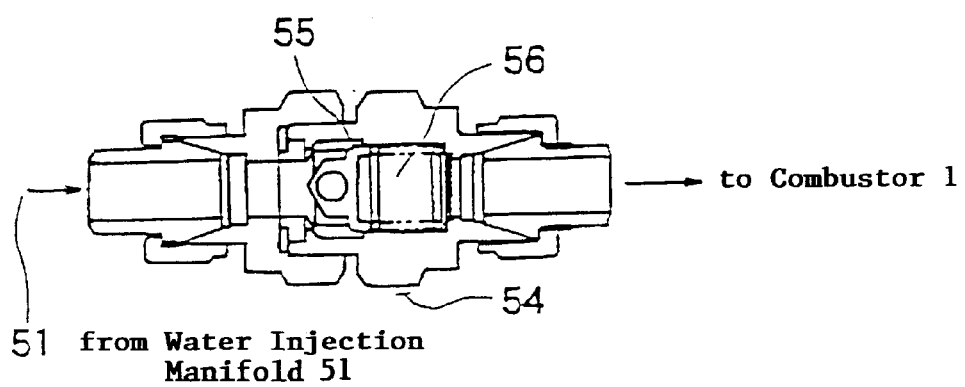
FIG. 2 is a longitudinal cross sectional view of a pressure type check valve used in the embodiment of FIG. 1.
Figure 4:
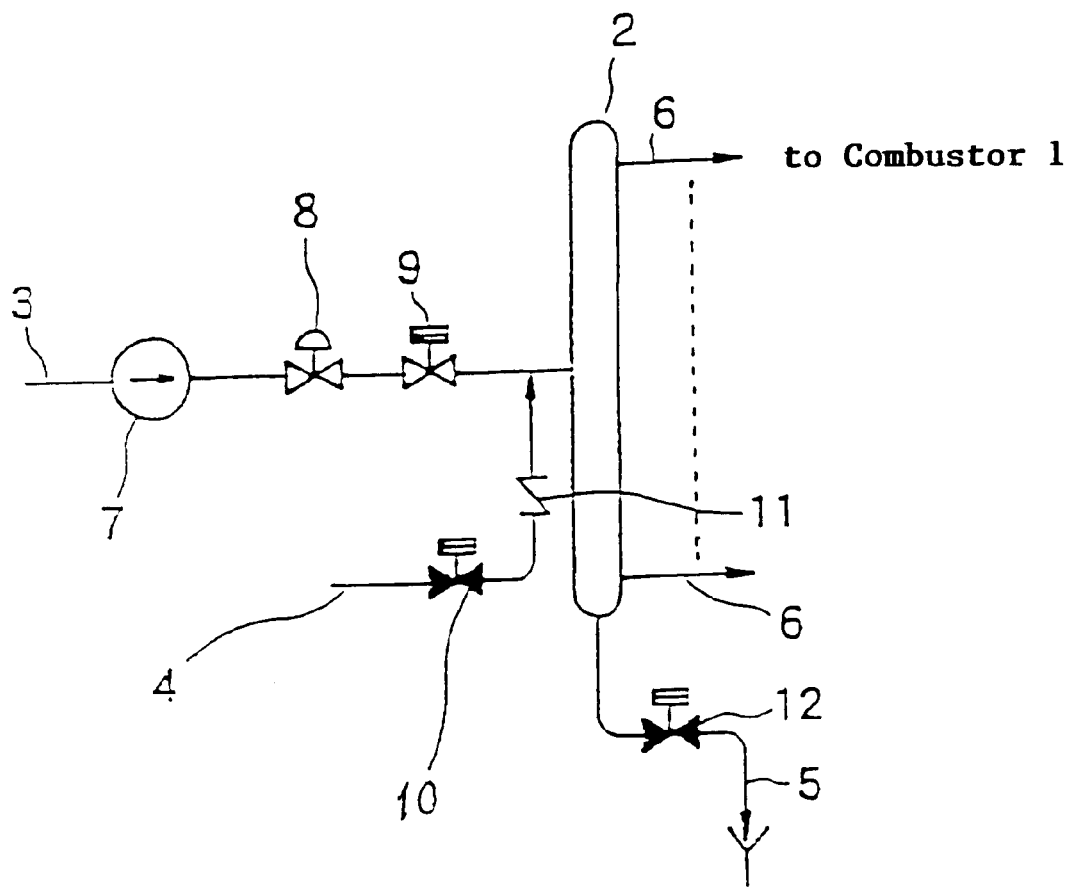
FIG. 4 is a block diagram showing the water injection manifold in the prior art.
Figure 5:
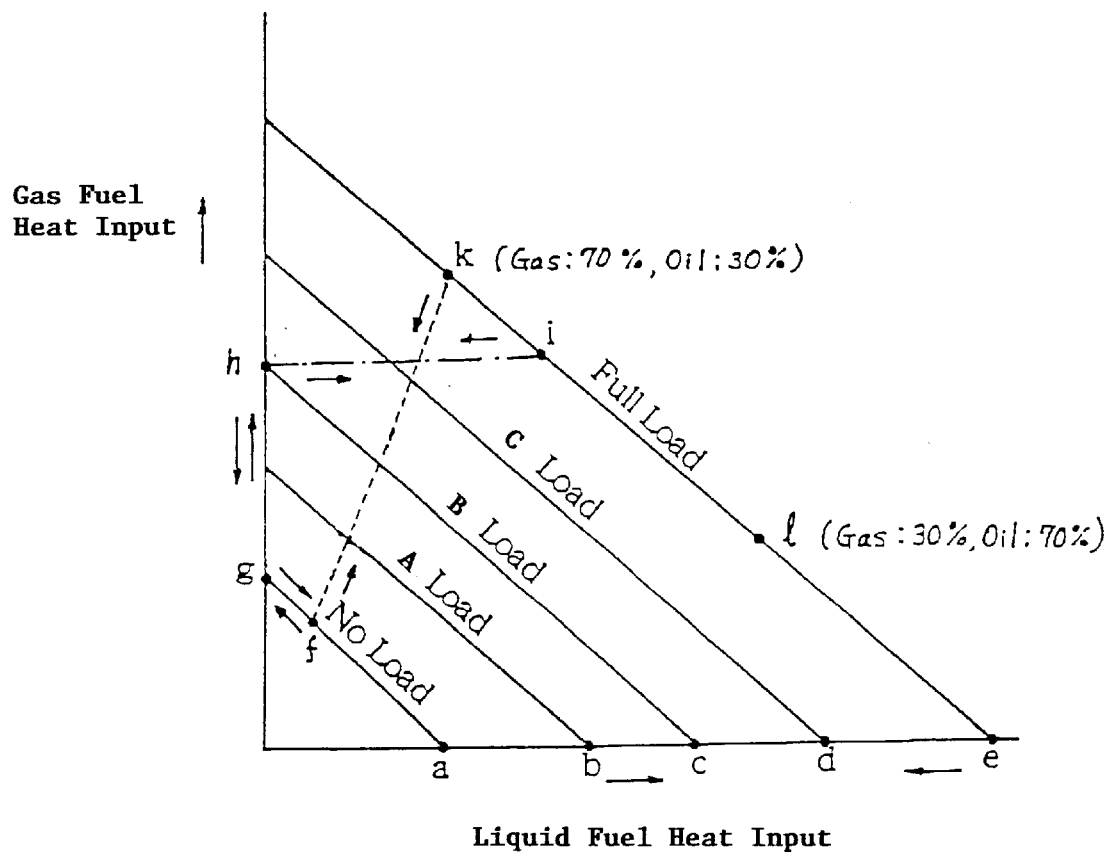
FIG. 5 is a graph showing examples of liquid fuel heat input and gas fuel heat input according to load state in the gas turbine of FIG. 3.

Herebelow, an embodiment of a multifunctional water injection manifold device according to the present invention will be described with reference to FIGS. 1 and 2. It is to be noted that in FIGS. 1 and 2, the same or similar parts as those of the prior art water injection manifold shown in FIG. 4 are given the same reference numerals and description thereon will be omitted. FIG. 1 is a block diagram showing a multifunctional water injection manifold device of the embodiment according to the present invention and FIG. 2 is a longitudinal cross sectional view of a pressure type check valve used in the embodiment of FIG. 1.

Figure 3:
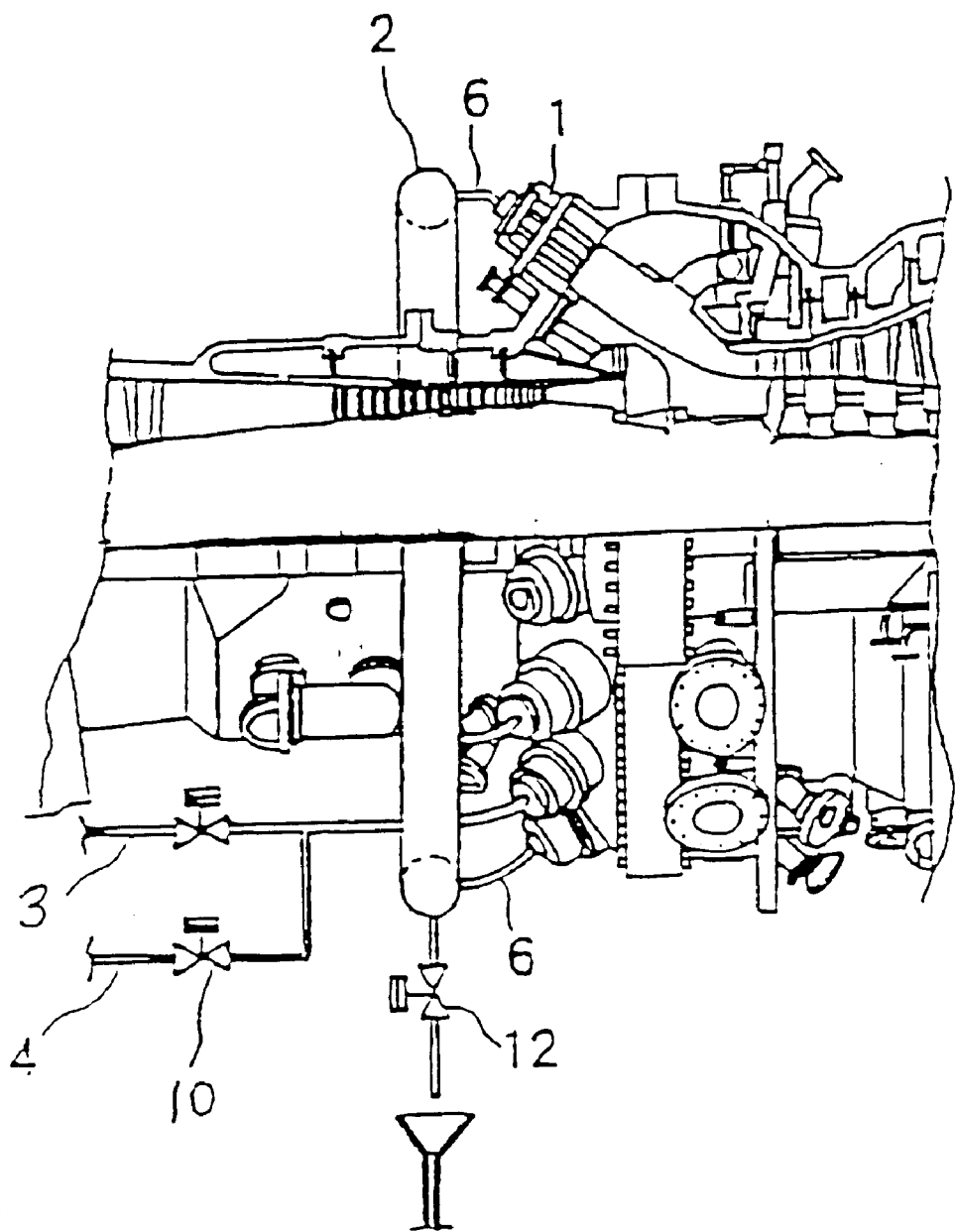
FIG. 3 is a view partially showing a liquid mono-fuel gas turbine or a liquid/gas dual-fuel gas turbine having a water injection manifold in the prior art, wherein an upper half part of FIG. 3 shows a cross sectional view and a lower half part of FIG. 3 shows an outside side view.

In FIG. 1, a multifunctional water injection manifold device 50 of the present embodiment includes a water injection manifold 51, which is formed by a master pipe in an annulus of 5 to 6 m diameter surrounding a turbine cylindrical body, like the prior art water injection manifold 2 shown in FIG. 3. Between the water injection manifold 51 and the plurality of combustors 1, a plurality of branch pipes 6, each being of 15 mm diameter in the present embodiment, are provided so that each of the combustors 1 is connected to the water injection manifold 51 via the respective branch pipes 6.

While the basic construction of the water injection manifold 51 of the present embodiment is the same as that of the prior art water injection manifold 2, the multifunctional water injection manifold device 50 further includes an air vent pipe 52 connected to a top portion of the water injection manifold 51 and an air vent valve 53 interposed in the air vent pipe 52 as well as a plurality of pressure type check valves 54, each being interposed in the respective branch pipes 6.

By the above construction of the multifunctional water injection manifold device 50, while the draining of the water injection manifold 2 in the prior art is carried out by the high pressure combustion gas in the turbine cylinder, the draining of the water injection manifold 51 of the present invention is carried out naturally by gravity, irrespective of the state of the combustion gas in the turbine cylinder. In other words, even if the timing of the water injection start/stop is set to a certain load, the pressure in the turbine cylinder is blocked by the pressure type check valve 54, and without waiting for a no load state where the temperature and pressure in the turbine cylinder are reduced, the draining can be done with both of the air vent valve 53 and the drain valve 12 being opened.

The pressure type check valve 54, as shown in FIG. 2, comprises a valve portion 55 for opening and closing a passage passing through in the valve and a spring 56 acting on the valve portion 55. The check valve 54 is constructed such that liquid or gas may not flow reversely therethrough from the combustor 1 side to the water injection manifold 51 side. Thus, even in case the water injection is stopped at a certain load, the high temperature high pressure combustion gas in the turbine cylinder may not come into the water injection manifold 51 and the draining can be done without waiting for no load state. In addition, there is no concern about the eruptive breakage of the water injection manifold 51 by the combustion gas flowing reversely thereinto.

Also, the water injection manifold 51 being a large annulus of 5 to 6 m diameter, as mentioned before, there arises a differential pressure corresponding to the water head between the top portion and the bottom portion of the water injection manifold 51. In order to compensate for this differential pressure, that is, 0.5 to 0.6 $kg/cm^2g$, the spring 56 has a pressing force corresponding thereto acting on the valve portion 55. Thus, when the water injection is stopped or the shut-off valve 9 is closed and yet the draining of the water injection manifold 51 is not done at the same time, the phenomenon that water not sufficiently atomized may flow into the gas turbine lower portion by the water head can be prevented from occurring. Therefore, the combustors 1 and the surroundings of the first stage stationary blades are not cooled rapidly by the water not sufficiently atomized so that damage due to strong thermal shocks can be avoided.

As described with respect to FIG. 6, the injection nozzle 17 for the water injection has the oil hole 14 in the nozzle axial central portion, the water holes 16 surrounding the oil hole 14 and the gas holes 13 in the outermost circumferential portion.

Thus, when the operation by oil firing is stopped, oil fuel trails down to enter especially the lowermost water hole 16 to be carbonized there under the high temperature environment and there is a possibility of clogging the water holes 16. Hence, when the water injection is stopped, the draining is carried out and then the sweep air supply valve 10 is opened so that sweep air of about 7 $kg/cm^2g$ pressure is supplied into the water holes 16. Thereby, the fuel oil which has trailed down into the water holes 16, especially into the lowermost water hole 16, is blown off into the combustor to prevent the clogging of the water holes 16.

According to the multifunctional water injection manifold device 50 of the present embodiment as described above, the pressure type check valve 54 is interposed in each of the branch pipes 6 for causing the water injection manifold 51 to communicate with the combustor 1. Thus, the water injection manifold 51 is completely separated from the turbine cylinder side via the pressure type check valve 54 so that even if dust accumulation occurs in the drain valve 12 so as to cause a small passage communicating with the outside air and the inner pressure of the water injection manifold 51 becomes lower than the pressure on the turbine cylinder side, the high temperature high pressure combustion gas in the turbine cylinder will not flow reversely into the water injection manifold 51.

This means that a safe gas turbine operation becomes possible in any load condition, or a start/stop of the gas turbine may be done at any time, and a highly reliable gas turbine plant may be obtained.

Further, the pressure type check valve 54 is provided with the spring 56 having a spring force which is slightly larger than 0.5 to 0.6 kg corresponding to the water head of 5 to 6 m of the water injection manifold 51 so as to act on the valve portion 55 in the direction from the turbine cylinder side toward the water injection manifold side. Thus, even when the shut-off valve 9 is closed so as to stop the water injection during any load operation of the gas turbine, the water not sufficiently atomized by the water head of the water injection manifold 51 is prevented from flowing into the lower portion of the combustor 1 and the first stage stationary blade in the turbine cylinder. Hence, especially in the case where the water injection is stopped during a high load operation of the gas turbine, the high temperature portion of the gas turbine is prevented from being cooled quickly by the water not sufficiently atomized, which results in reducing an accident of the gas turbine to obtain a high durability thereof.

Thus, according to the multifunctional water injection manifold device 50 of the prevent embodiment, the water injection stop becomes possible at any load operation of the gas turbine without damaging the gas turbine high temperature portion. Therefore, the gas turbine water injection operation range is broadened and the economical effect is enlarged by the reduction of the maintenance and repair cost because of no damage of the high temperature portion.

In case the draining of the water injection manifold 51 is to be done, it can be simply done by opening the air vent valve 53 and then opening the drain valve 12.

Also, the water holes 16 for injecting water into the combustor 1 are of a small diameter and yet are provided near the oil hole 14. Therefore, when the oil firing gas turbine is stopped, sweep operation of the water holes 16 becomes necessary for prevention of coking. Even in this case, however, immediately after the draining is done, pressurized air of 5 to 7 kg/cm$^2$g for sweeping flows through the water holes 16 to overcome the spring 56 force of about 0.5 to 0.6 kgf, thereby the sweeping can be done securely.

As mentioned above, the draining of the manifold and the sweeping of the water injection holes as required in the ordinary gas turbine operation can be done securely so as to enable a stable operation without coking of the nozzle holes and there is obtained a remarkable effect in the economy, reliability and stable operation by the multifunctional water injection manifold device 50 of the present embodiment.

In addition to the description made in the above, the operation method of the present multifunctional water injection manifold device 50 at the time of start/stop of the gas turbine and during operation of the gas turbine will be shown in Table 1 with respect to the operation mode of the pump and valves provided therein.

TABLE 1

| | Gas Turbine | | | | | |
|---|---|---|---|---|---|---|
| | At the time of start | | During Operation → Full | At the time of stop | | |
| | Ignition | Water Injection Start | | Water Injection Stop | Parallel Off (Draining) | Stop |
| Water Injection Pump 7 | On | On | On | On | On | Off |
| Shut-off Valve 9 | Closed | Open | Open | Closed | Closed | Closed |
| Air Vent Valve 53 | Closed | Closed | Closed | Closed | Open | Closed |

TABLE 1-continued

| | Gas Turbine | | | | | |
|---|---|---|---|---|---|---|
| | At the time of start | | During Operation → Full | At the time of stop | | |
| | Ignition | Water Injection Start | | Water Injection Stop | Parallel Off (Draining) | Stop |
| Drain Valve 12 | Closed | Closed | Closed | Closed | Open | Closed |
| Sweep Air Supply Valve 10 | Closed | Closed | Closed | Closed | Closed | Open |

While a preferred embodiment has been described, variations thereto will occur to those skilled in the art within the scope of the present inventive concepts which are delineated by the following claims.

What is claimed is:

1. A multifunctional water injection manifold device, to be used in a liquid mono-fuel gas turbine or a liquid/gas dual-fuel gas turbine, comprising a water injection manifold to be filled with water to be injected into a combustor to lower combustion gas temperature for NOx reduction;

an air communication means having an air vent pipe and an air vent valve, provided at a top portion of said water injection manifold, said air communication means being operable to allow said water injection manifold to communicate with the air; and a pressure type check valve interposed in a branch pipe for supplying said combustor with the water to fill said water injection manifold, said pressure type check valve being operable to allow the water in said water injection manifold to flow freely toward said combustor when a differential pressure between said water injection manifold and said combustor is at least a predetermined differential pressure, and being operable to close a communication between said water injection manifold and said combustor when said differential pressure is less than said predetermined differential pressure.

2. A method of operating a multifunctional water injection manifold device in a liquid mono-fuel gas turbine or a liquid/gas dual-fuel gas turbine, the device including a water injection manifold filled with water to be injected into a combustor to lower combustion gas temperature for NOx reduction, the method comprising:

while the gas turbine is in operation, causing said water injection manifold to communicate with the air by using an air communication means provided at a top portion of said water injection manifold;

draining the water in said water injection manifold via a drain pipe provided at a bottom portion of said water injection manifold; and while preventing combustion gas from flowing reversely from said combustor toward said water injection manifold by a pressure type check valve interposed in a branch pipe for allowing said water injection manifold to communicate with said combustor, preventing the water in said water injection manifold from flowing toward said combustor by using said pressure type check valve when a differential pressure between said water injection manifold and said combustor is less than a predetermined differential pressure;

whereby the draining of said water injection manifold may be done without waiting for a no load state even when water injection is stopped during load operation of the gas turbine.

* * * * *